3,308,134
SPIRO(INDAN-2,3'-INDOLINE)-1,2'-DIONES
Janis Plostnieks, Philadelphia, Pa., assignor to McNeil Laboratories, Incorporated, a corporation of Pennsylvania
No Drawing. Filed Oct. 22, 1965, Ser. No. 502,270
14 Claims. (Cl. 260—325)

This invention relates to novel organic compounds and more particularly to certain spiro(indan-2,3'-indoline)-1,2'-diones, to processes for their preparation, and to new intermediate compounds involved in said processes.

The novel spiro(indan-2,3'-indoline)-1,2'-diones of this invention may be represented by the following structural formula:

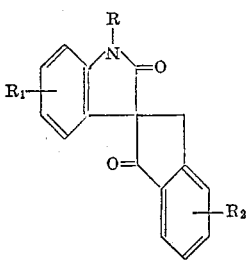

wherein R is a member selected from the group consisting of hydrogen and lower alkyl; $R_1$ is a member selected from the group consisting of hydrogen, lower alkyl and halo; and $R_2$ is a member selected from the group consisting of hydrogen, lower alkoxy and halo.

As used herein, lower alkyl and lower alkoxy preferably have from 1 to 5 carbon atoms, including straight or branched saturated aliphatic chains, such as, for example, methyl, ethyl, propyl, isopropyl, butyl, isobutyl, secondary-butyl, pentyl and the like, and, respectively, methoxy, ethoxy, propoxy, isopropoxy, etc.

The compounds (I) of this invention have valuable pharmacological applications in view of their central nervous system (CNS) depressant activity.

The subject compounds (I) may be advantageously prepared by using an appropriate 3-phthalidyl-2-indolinone (II) as the starting material, the tautomeric forms of which may be illustrated as follows (R, $R_1$ and $R_2$ are as previously defined):

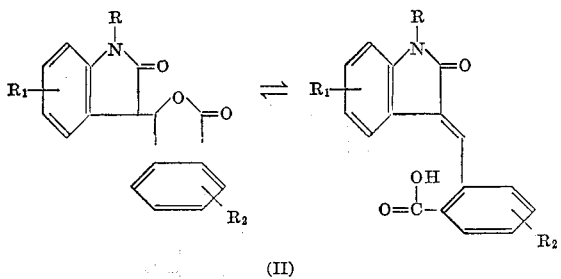

By subjecting (II) to hydrogenation, for example, at elevated pressure of about 1600 p.s.i.g. and a temperature of about 75° C. for about 20 hours in the presence of a sponge nickel catalyst, the intermediate products (III) are obtained. Such intermediates, which may be denoted as 2-[(2'-oxo-3'-indolyl)methyl]benzoic acids, are novel compounds and constitute an additional feature of this invention. Cyclodehydration of the latter, which may be achieved under acidic dehydrating conditions, e.g., with anhydrous hydrofluoric acid, polyphosphoric acid and the like affords the compounds of Formula I. The cyclodehydration step is preferably conducted in polyphosphoric acid (PPA) at elevated temperatures of about 160° C.– 200° C. and, preferably, at 175° C.–185° C. The reaction schemes may be illustrated as follows:

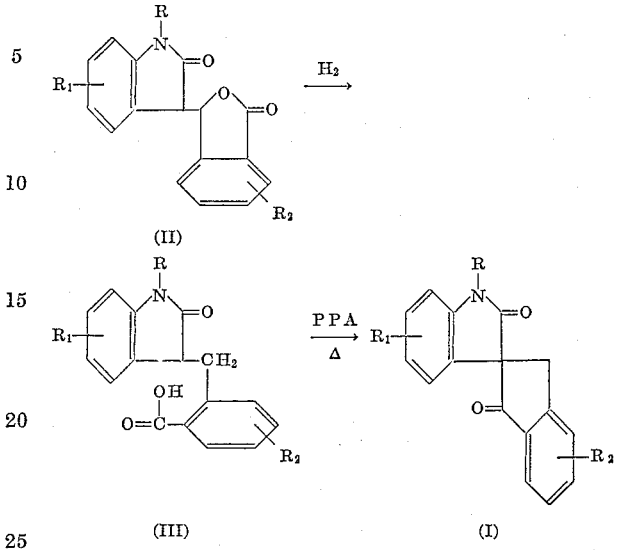

The starting materials (II) are disclosed in and may be prepared according to the processes described in copending application Serial No. 502,329. In general, they are prepared by reacting a 2-indolinone of Formula IV with a phthalaldehydic acid of Formula V, wherein R, $R_1$ and $R_2$ are as previously described, in the presence of a base such as, for example, an alkali metal hydroxide or lower alkoxide, e.g., sodium hydroxide, potassium hydroxide, sodium ethoxide, potassium tert-butoxide and the like; and tertiary amines such as, for example, trialkyl amines, e.g., triethylamine, tributylamine and the like, and heterocyclic amines, e.g., pyridine, N-alkyl piperidine, N-alkyl morpholine, quinoline and the like. The reaction is advantageously carried out in suitable organic solvents such as, for example, lower alkanols, e.g., methanol, tert-butanol and the like; and ethers, e.g., diethyl ether, ethylene glycol dimethyl ether and the like. Among the preferred bases and solvents are triethylamine and methanol, respectively. Elevated temperatures may be advantageously employed. The reaction scheme may be illustrated as follows:

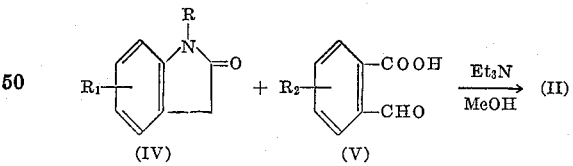

The following examples are intended to illustrate, but not to limit, the scope of the present invention.

*Example 1*

1-methyl-3-phthalidyl-2-indolinone (50 g., 0.17 mole) is suspended in 300 ml. of 95% ethanol. To this suspension is added 25 g. of sponge nickel and the mixture is hydrogenated in a Paar bomb at 1600 p.s.i.g. at 75° C. for 20 hours. The catalyst is removed by filtration and the solvent evaporated. The residue is suspended in chloroform and washed with sodium bicarbonate solution. A solid material (sodium salt of product) precipitates which is removed by filtration. The precipitate is treated with 4 N hydrochloric acid to convert the salt to its acid form and then extracted with chloroform. The chloroform solution is dried over anhydrous magnesium sulfate, filtered and evaporated in vacuo, yielding an oily residue. Crystallization of the latter from ethyl acetate affords 2-[(1'-methyl-2'-oxo-3'-indolyl)-methyl]-benzoic acid, M.P. 166–171° C. Recrystallization from ethyl acetate-heptane brings the melting point to 166.5–168.5° C.

Analysis.—Calculated for $C_{17}H_{15}NO_3$: C, 72.58; H, 5.37; N, 4.98%. Found: C, 72.46; H, 5.28; N, 5.05%.

Example II 3-phthalidyl-2-indolinone (50 g.) is suspended in 300 ml. of 95% ethanol. To this suspension is added 25 g. of sponge nickel and the mixture is hydrogenated in a Paar bomb at 1600 p.s.i.g. at 75° C. for 20 hours. The catalyst is removed by filtration and the solvent evaporated. The residue is suspended in chloroform and washed with sodium bicarbonate solution. The basic solution is made acidic with 4 N hydrochloric acid and extracted with chloroform. The chloroform solution is dried over anhydrous magnesium sulfate, filtered and evaporated in vacuo, yielding an oil which, upon crystallization from ethyl acetate, yields 2-[(2'-oxo-3'-indolyl)-methyl]benzoic acid.

Example III

The procedure of Example II is followed except that an equivalent quantity of the 1-ethyl, 4-methyl, 5-methyl, 6-methyl, 7-methyl, 4-chloro, 1,7-dimethyl and 1-methyl-5-chloro derivative, respectively, of 3-phthalidyl-2-indolinone is used instead of the 3-phthalidyl-2-indolinone used therein to yield, as respective products, 2-[(1'-ethyl-2'-oxo-3'-indolyl)-methyl]benzoic acid, 2-[(4'-methyl-2'-oxo-3'-indolyl)-methyl]-benzoic acid, 2-[(5'-methyl-2'-oxo-3'-indolyl)-methyl]benzoic acid, 2-[(6'-methyl-2'-oxo-3'-indolyl)-methyl]benzoic acid, 2-[(7'-methyl-2'-oxo-3'-indolyl)-methyl]benzoic acid, 2-[(4'-chloro-2'-oxo-3'-indolyl)-methyl]benzoic acid, 2-[(1',7'-dimethyl-2'-oxo-3'-indolyl)-methyl]benzoic acid, and 2-[(1'-methyl-2'-oxo-5'-chloro-3'-indolyl)-methyl]benzoic acid.

Example IV

A. In accordance with the procedure of Example I, except that an equivalent quantity of 1-methyl-3-(6'-chloro-phthalidyl)-2-indolinone, 1-methyl-3-(6'-methoxy-phthalidyl)-2-indolinone, 1-methyl-3-(4'-methoxy-phthalidyl)-2-indolinone, and 1-methyl-3-(5'-methoxy-phthalidyl)-2-indolinone, respectively, is used in place of the 1-methyl-3-phthalidyl-2-indolinone used therein, there are obtained, as respective products, 2-[(1'-methyl-2'-oxo-3'-indolyl)-methyl]-5-chloro-benzoic acid, 2-[(1'-methyl-2'-oxo-3'-indolyl)-methyl]-5-methoxy-benzoic acid, 2-[(1'-methyl - 2' - oxo-3'-indolyl)-methyl]-3-methoxy-benzoic acid, and 2-[(1' - methyl - 2' - oxo-3'-indolyl)-methyl]-4-methoxy-benzoic acid.

B. By following the procedure of Example II, except that an equivalent quantity of the 6'-chloro, 6'-methoxy, 4'-methoxy and 5'-methoxy derivative, respectively, of 3-phthalidyl 2-indolinone is used in place of the 3-phthalidyl-2-indolinone used therein, there are obtained, as respective products, the corresponding 5-chloro, 5-methoxy, 3-methoxy and 4-methoxy derivative of 2-[(2'-oxo-3'-indolyl)-methyl]benzoic acid.

Example V

The procedure of Example II is followed except that an equivalent quantity of 1-ethyl-3-(6'-chloro-phthalidyl)-2 - indolinone, 6-methyl-3-(5'-methoxy-phthalidyl)-2-indolinone, 1-methyl-5-chloro-3-(4'-methoxy-phthalidyl)-2-indolinone, and 5-chloro-3-(6'-methoxy-phthalidyl)-2-indolinone, respectively, is used in place of the 3-phthalidyl-2-indolinone used therein to yield, as respective products, 2[(1' - ethyl-2'-oxo-3'-indolyl)-methyl]-5-chloro-benzoic acid, 2-[(6' - methyl - 2' - oxo-3'-indolyl)-methyl]-4-methoxy - benzoic acid, 2-[(1'-methyl-2'-oxo-5'-chloro-3'-indolyl)-methyl]-3-methoxy-benzoic acid, and 2-[(5'-chloro-2'-oxo-3'-indolyl)-methyl]-5-methoxy-benzoic acid.

Example VI

2 - [(1'-methyl-2'-oxo-3'-indolyl)-methyl]benzoic acid (8 g., 0.036 mole) is suspended in 80 g. of polyphosphoric acid at 160° C. The reaction mixture is stirred and heated up to 180° C. The solution is then poured over 200 g. of ice and water and extracted with chloroform. The chloroform solution is dried over anhydrous magnesium sulfate and filtered. Evaporation of the solvent in vacuo yields a tan solid. Recrystallization from benzene gives 4.5 g. of 1'-methylspiro(indan-2,3'-indoline)-1,2'-dione; M.P. 180–190° C. The melting point after a further recrystallization from acetonitrile is 188.5–189.5° C.

Analysis.—Calculated for $C_{17}H_{13}NO_2$: C, 77.55; H, 4.98; N, 5.32%. Found: C, 77.61; H, 4.87; N, 5.56%.

Example VII

Spiro(indan-2,3'-indoline)-1,2'-dione is obtained by following the cyclodehydrating procedure of Example VI except that an equivalent quantity of 2-[(2'-oxo-3'-indolyl)-methyl]-benzoic acid is used in place of the 2-[(1'-methyl-2'-oxo-3'-indolyl)-methyl]bonzoic acid used therein.

Example VIII

In accordance with the cyclodehydrating procedure of Example VI, and by starting with an equivalent quantity of an appropriately substituted 2-[(2'-oxo-3'-indolyl)-methyl]benzoic acid obtained from Examples III, IV and V in place of the 2-[(1'-methyl-2'-oxo-3'-indolyl)-methyl] benzoic acid used in Example VI, the following respective produtcs are obtained:

1'-ethylspiro(indan-2,3'-indoline)-1,2'-dione,
5'-methylspiro(indan-2,3'-indoline)-1,2'-dione,
4'-chlorospiro(indan-2,3'-indoline)-1,2'-dione,
1'-methyl-5'-chlorospiro(indan-2,3'-indoline-1,2'-dione,
1'-methylspiro(indan-2,3'-indoline)-6-chloro-1,2'-dione,
1'-methylspiro(indan-2,3'-indoline)-4-methoxy1,2'-dione,
spiro(indan-2,3'-indoline)-5-methoxy-1,2'-dione,
spiro(indan-2,3'-indoline)-6-chloro-1,2'-dione,
1'-ethylspiro(indan-2,3'-indoline)-6-chloro-1,2'-dione,
6'-methylspiro(indan-2,3'-indoline)-5-methoxy-1,2'-dione,
1'-methyl-5'-chlorospiro(indan-2,3'-indoline)-4-methoxy-1,2'-dione, and
5'-chlorospiro(indan-2,3'-indoline)-6-methoxy-1,2'-dione.

What is claimed is:
1. A spiro(indan-2,3'-indoline)-1,2'-dione of the formula:

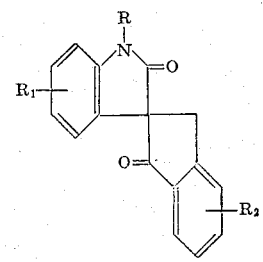

wherein R is a member selected from the group consisting of hydrogen and lower alkyl; $R_1$ is a member selected from the group consisting of hydrogen, lower alkyl and chloro; and $R_2$ is a member selected from the group consisting of hydrogen, lower alkoxy and chloro.

2. Spiro(indan-2,3'-indoline)-1,2'-dione.
3. 1'-(lower alkyl)spiro(indan-2,3'-indoline)-1,2'- dione.
4. 1'-methylspiro(indan-2,3'-indoline)-1,2'-dione.

5. A method which comprises cyclodehydrating 2-[(2'-oxo-3'-indolyl)-methyl]benzoic acid having the formula:

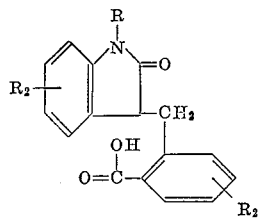

to form spiro(indan-2,3'-indoline)-1,2'-dione having the formula:

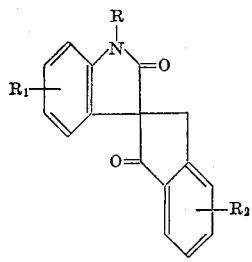

wherein R is a member selected from the group consisting of hydrogen and lower alkyl; R₁ is a member selected from the group consisting of hydrogen, lower alkyl and chloro; and R₂ is a member selected from the group consisting of hydrogen, lower alkoxy and chloro.

6. A method which comprises treating 2-[(2'-oxo-3'-indolyl)-methyl]benzoic acid with polyphosphoric acid at a temperature of about 160–200° C. to form spiro(indan-2,3'-indoline)-1,2'-dione.

7. A method which comprises treating 2-[(1'-lower alkyl-2'-oxo-3'-indolyl)-methyl]benzoic acid with polyphosphoric acid at a temperature of about 160–200° C. to form 1'-(lower alkyl)-spiro(indan-2,3'-indoline)-1,2'-dione.

8. A method of preparing spiro(indan-2,3'-indoline)-1,2'-dione of Formula I:

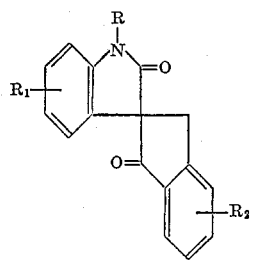

which comprises hydrogenating 3-phthalidyl-2-indolinone of Formula II:

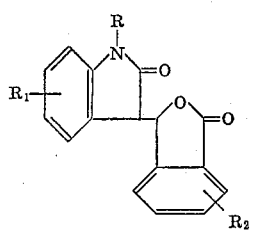

to form 2-[(2'-oxo-3'-indolyl)-methyl]-benzoic acid of Formula III:

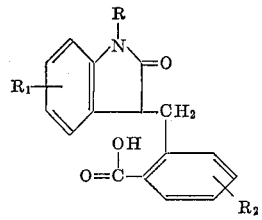

and subsequently cyclodehydrating (III) to form (I), wherein the foregoing formulas R is a member selected from the group consisting of hydrogen and lower alkyl; R₁ is a member selected from the group consisting of hydrogen, lower alkyl and chloro; and R₂ is a member selected from the group consisting of hydrogen, lower alkoxy and chloro.

9. A method which comprises hydrogenating 3-phthalidyl-2-indolinone to form 2-[(2'-oxo-3'-indolyl)-methyl] benzoic acid, and treating the latter with polyphosphoric acid at a temperature of about 160–200° C. to form spiro-(indan-2,3'-indoline)-1,2'-dione.

10. A method which comprises hydrogenating 1-(lower alkyl)-3-phthalidyl-2-indolinone to form 2-[(1'-lower alkyl-2'-oxo-3'-indolyl)-methyl]benzoic acid, and treating the latter with polyphosphoric acid at a temperature of about 160–200° C. to form 1'-(lower alkyl)-spiro(indan-2,3'-indoline)-1,2'-dione.

11. 2-[(2'-oxo-3'-indolyl)-methyl]benzoic acid of the formula:

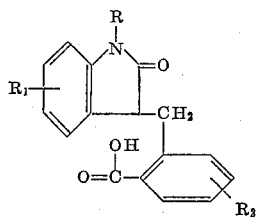

wherein R is a member selected from the group consisting of hydrogen and lower alkyl; R₁ is a member selected from the group consisting of hydrogen, lower alkyl and chloro; and R₂ is a member selected from the group consisting of hydrogen, lower alkoxy and chloro.

12. 2-[(2'-oxo-3'-indolyl)-methyl]benzoic acid.

13. 2-[(1'-lower alkyl-2'-oxo-3'-indolyl)-methyl]-benzoic acid.

14. 2-[(1'-methyl-2'-oxo-3' - indolyl) - methyl]benzoic acid.

No references cited.

ALEX MAZEL, *Primary Examiner.*

MARY O'BRIEN, *Assistant Examiner.*